Figure 1:
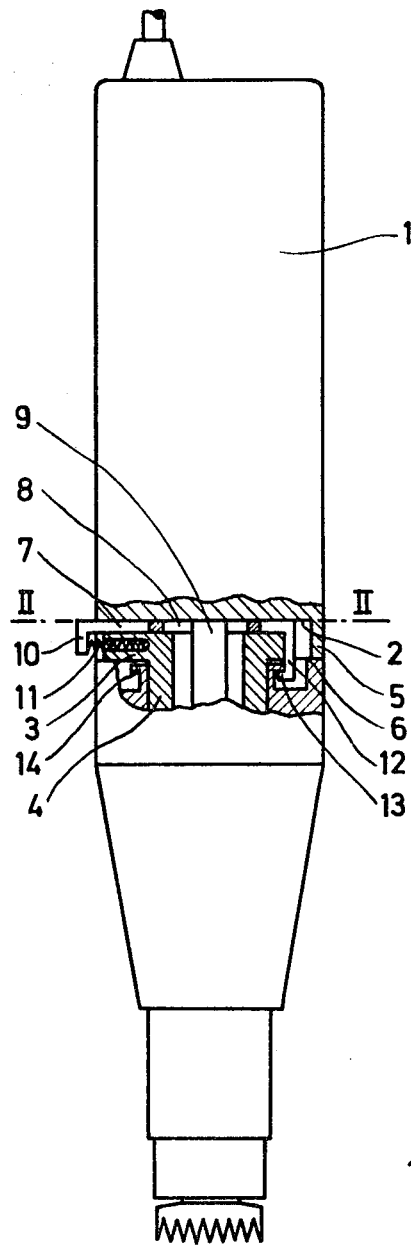

United States Patent

[11] 3,604,735

| [72] | Inventor | Erich Hoffmeister<br>Biberach, Riss, Germany |
|---|---|---|
| [21] | Appl. No. | 852,844 |
| [22] | Filed | Aug. 25, 1969 |
| [45] | Patented | Sept. 14, 1971 |
| [73] | Assignee | Kaltenbach & Voigt<br>Biberach/Riss, Germany |
| [32] | Priority | Aug. 28, 1968 |
| [33] | | Germany |
| [31] | | P 17 91 013.3 |

[54] COUPLING FOR DENTAL INSTRUMENTS
3 Claims, 6 Drawing Figs.

[52] U.S. Cl. ..................................................... 287/119 R,
279/76
[51] Int. Cl. ..................................................... F16b 7/00
[50] Field of Search............................................ 287/119;
279/76, 79, 89, 1 B; 285/317; 32/26, 27

[56] References Cited
UNITED STATES PATENTS

| 1,176,205 | 3/1916 | Cutlip............................ | 279/76 UX |
| 1,190,383 | 7/1916 | Court............................. | 279/79 UX |
| 1,416,907 | 5/1922 | Taylor et al.................... | 287/119 |
| 2,771,308 | 11/1956 | Vitcha et al. .................. | 285/317 X |
| 3,100,661 | 8/1963 | Knight........................... | 287/119 |
| 3,185,494 | 5/1965 | Dziedzic et al. ............... | 279/89 |
| 3,432,194 | 3/1969 | Garnier.......................... | 287/119 |

Primary Examiner—David J. Williamowsky
Assistant Examiner—Andrew V. Kundrat
Attorney—Weir, Marshall, MacRae & Lamb ABSTRACT: The invention relates to a coupling for the connection of a dental straight or angle handpiece to an electrical driving motor constructed as a miniature motor, the coupling being arranged substantially within a disc which is connected to the drive-side end of the miniature motor. The coupling is constituted by operating element movably mounted in the disc and which is urged into locking position by a spring.

PATENTED SEP 14 1971

3,604,735

SHEET 1 OF 2

INVENTOR.
Erich Hoffmeister
BY
Weir, Marshall, MacRae & Lamb

PATENTED SEP 14 1971 3,604,735
SHEET 2 OF 2
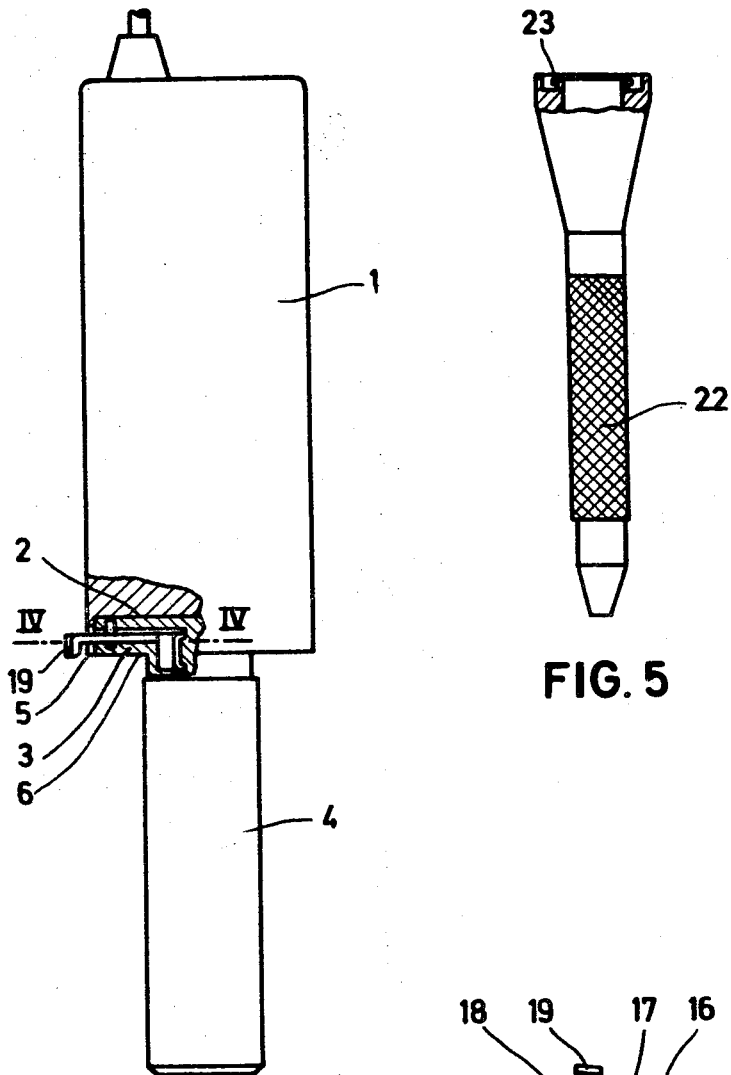
FIG. 3
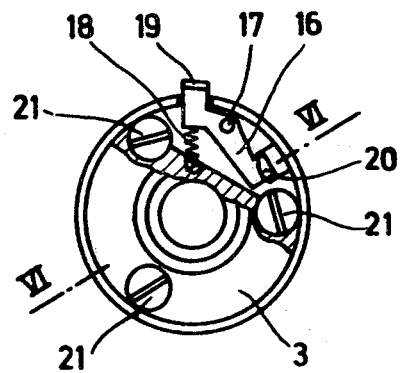
FIG. 5
FIG. 4
INVENTOR.
Erich Hoffmeister
BY
Weir, Marshall, MacPeak
& Lamb

COUPLING FOR DENTAL INSTRUMENTS

Known couplings of this kind have the disadvantage that important coupling elements are arranged either in the sleeve of the miniature motor or on the fit-on sleeve for the dental instruments, or even in both sleeves. Apart from the relatively considerable outlay involved in arranging appropriate recesses, these couplings have the disadvantages that the sleeves are weakened by the apertures provided. This is true more particularly of fit-on sleeves which have over their entire length a recess for accommodating a leaf spring.

The known couplings have also the disadvantage that the interior of the fit-on sleeve cannot be used as an air guide, since the air cannot pass out to the exterior through the aforesaid recesses. These disadvantages are obviated by the coupling according to the invention.

The coupling according to the invention is characterized in that the operating element of the coupling is held in the locking position radially outwardly of the periphery of the disc under the action of a likewise radially acting helical spring, and the other end of the coupling, projecting out of the front side of the disc in axially parallel manner is provided with a radially bent over hook with which it engages behind a collar on the rear end of the instrument or intermediate element to be coupled on, whereas when the operating element is pressed-in in opposition to the action of the spring the hook engaging behind the collar releases the collar for removal of the instrument.

A preferred form of embodiment of the coupling according to the invention resides in that the coupling, arranged within the disc, comprises a radially mobile slide which in the central portion engages with adequate play about the driving shaft, the bent over end of the slide projecting radially from the disc periphery being influenced by a radially acting helical spring, and the end of the slide which is bent over in axially parallel manner has a bent over hook with which it engages behind a collar of the instrument to be coupled.

A further form of embodiment of the invention is characterized in that the coupling arranged within the disc is constructed as a two-alarm lever and the helical spring is effective radially in the direction of the operating element projecting from the periphery of the disc.

Figure 6:
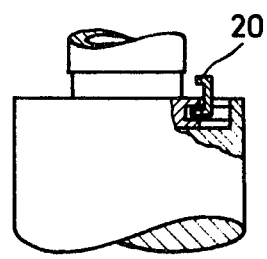
Figure 2:
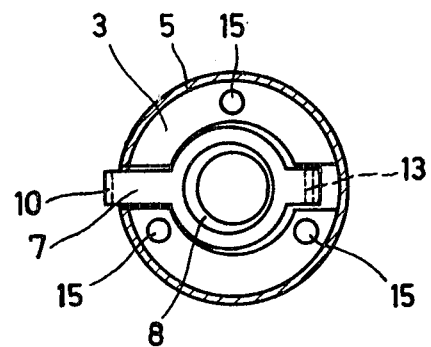

The two examples of the embodiment of the invention are shown in the drawings, in which FIG. 1 is a side view, partly in section, of one form of embodiment of the coupling with driving motor and coupled on intermediate element, FIG. 2 shows a section taken on the line II—II of FIG. 1, FIG. 3 is a side view partly in section, of the other form of embodiment of the coupling with driving motor, FIG. 4 shows a section taken on the line IV–IV of FIG. 3, FIG. 5 shows in side view, partly in section, and also on a smaller scale than in FIGS. 1 to 4, a handpiece for direct coupling to the driving motor, FIG. 6 shows a sectional view taken on the line VI—VI of FIG. 4.

In the drawings, 1 designates the driving motor against whose drive-side end 2 an end flange or disc 3 of the fit-on sleeve 4 abuts. FIGS. 1 and 3 also show that the sleeve of the driving motor 1 comprises a projecting rim 5 so that the outer surface 6 of the flange 3 finishes flush with the sleeve of the driving motor 1.

FIGS. 1 and 2 show the coupling with the radially mobile slide 7 which at its central portion comprises a circular aperture 8 so that the driving shaft 9 is not prejudiced when the coupling is operated. The bent over end 10 of the slide 7 projecting radially from the flange periphery serves as operating element for the coupling. As FIG. 1 shows, the bent over end 10 of the slide 7 is under the influence of a helical spring 11 which is also arranged within the flange 3. The other end 12 of the slide 7, bent over in axially parallel manner, comprises a hook 13 which underlies the annular shoulder surface of the flange and engages behind the collar 14 of the intermediate element for instruments to be coupled on. This coupling, as is the case with other known couplings, guarantees free rotatability of the coupled on instrument or intermediate element. FIG. 2 also shows bores 15 through which screws extend in order to allow the flange 3 to be screwed to the coupling elements on the driving motor 1.

The other form of embodiment of the coupling according to the invention, which is shown in FIGS. 3, 4 and 6, comprises a two-arm lever 16 which is arranged to be pivotable in the flange 3 at 17. FIG. 4 shows that a helical spring 18 arranged likewise in the flange 3 influences one end, which projects out of the periphery of the flange 3, of the two-arm lever 16. This end of the two-arm lever is bent over axially as in the case of the form of embodiment shown in FIGS. 1 and 2, so that this end serves as operating element 19.

The other end of the two-arm lever 16 is bent over twice, as FIG. 6 shows more particularly, so that a hook 20 is formed which, like the hook 13 in FIGS. 1 and 2, engages behind the collar on the rear end of the instrument or intermediate element.

In FIG. 4 the fixing screws 21 can be seen with which the flange including the coupling elements is screwed to the driving motor 1.

The handpiece 22, which is shown on a smaller scale in FIG. 5, comprises at its rear end an annular collar 23 behind which the hooks 13 or 20 of the coupling engage when the instrument 22 is coupled to the driving motor 1.

I claim:

1. A coupling for connecting a dental handpiece to a miniature motor which comprises a sleeve having a motor shaft-receiving bore and a radially projecting flange at one end thereof, said flange having a flat end surface and an annular surface underlying said end surface, a unitary coupling member seated on said end surface for movement in a plane normal to the axis of said bore, said coupling member having first and second end portions each lying radially outwardly of the periphery of said flange, a radially inwardly extending hook carried by said first end portion for positioning in underlying relation to said annular surface of said flange, said second end portion having an end surface operatively engageable to impart movement to said coupling member, and an intermediate portion offset from said bore and connecting said end portions, and a spring connecting said coupling member and said flange and urging said coupling member in a direction to place said hook in position underlying said annular shoulder.

2. A coupling for connecting a dental handpiece to a miniature motor as defined in claim 1, said coupling member comprising a slide, said end portions thereof being in diametrically opposite relation to each other.

3. A coupling for connecting a dental handpiece to a miniature motor as defined in claim 1, said coupling member comprising a lever pivotally mounted on said flange intermediate said end portions thereof.